(12) United States Patent
Ait Aoudia et al.

(10) Patent No.: US 12,531,764 B2
(45) Date of Patent: Jan. 20, 2026

(54) RADIO RECEIVER, TRANSMITTER AND SYSTEM FOR PILOTLESS-OFDM COMMUNICATIONS

(71) Applicant: Nokia Technologies Oy, Espoo (FI)

(72) Inventors: Faycal Ait Aoudia, Saint-Cloud (FR); Jakob Hoydis, Paris (FR)

(73) Assignee: Nokia Technologies Oy, Espoo (FI)

( * ) Notice: Subject to any disclaimer, the term of this patent is extended or adjusted under 35 U.S.C. 154(b) by 298 days.

(21) Appl. No.: 18/023,547

(22) PCT Filed: Aug. 27, 2020

(86) PCT No.: PCT/EP2020/074001
§ 371 (c)(1),
(2) Date: Feb. 27, 2023

(87) PCT Pub. No.: WO2022/042845
PCT Pub. Date: Mar. 3, 2022

(65) Prior Publication Data
US 2023/0344675 A1  Oct. 26, 2023

(51) Int. Cl.
*H04L 25/02* (2006.01)
*H04L 27/26* (2006.01)
(52) U.S. Cl.
CPC ...... *H04L 25/0202* (2013.01); *H04L 27/2647* (2013.01)
(58) Field of Classification Search
CPC . H04L 25/0202; H04L 27/2647; G06N 3/045; G06N 3/08
(Continued)

(56) References Cited

U.S. PATENT DOCUMENTS

2020/0343985 A1* 10/2020 O'Shea ................. G06N 20/00

FOREIGN PATENT DOCUMENTS

| CN | 109379319 B | * | 2/2021 | .......... H04B 10/116 |
| WO | WO 2020/092391 A1 | | 5/2020 | |
| WO | WO 2020/104036 A1 | | 5/2020 | |

OTHER PUBLICATIONS

Gao "ComNet: Combination of Deep Learning and Expert Knowledge in OFDM Receivers" Dec. 2018 (Year: 2018).*
(Continued)

*Primary Examiner* — Juan A Torres
(74) *Attorney, Agent, or Firm* — McCarter & English, LLP; Mark F. Harrington

(57) ABSTRACT

A communication system including at least one receiver and at least one transmitter is described. The receiver is configured to communicate with the transmitter using a plurality of resource elements within a time-frequency OFDM grid. The transmitter is configured to transmit data-carrying symbols using all resource elements of the plurality of resource elements within the OFDM grid, wherein the data-carrying symbols are modulated using a constellation C. The receiver is configured to receive the data-carrying symbols on all resource elements of the plurality of resource elements within the OFDM grid, and to implement a neural network, configured to operate jointly on the plurality of resource elements, and to output, based on the received data-carrying symbols, a plurality of LLRs to reconstruct information bits from the received data-carrying symbols. The neural network is optimized with respect to the constellation C.

17 Claims, 12 Drawing Sheets

(58) Field of Classification Search
USPC .................................................... 455/552.1
See application file for complete search history.

(56) References Cited

OTHER PUBLICATIONS

Honkala, Mikko, et al., "DeepRX : Fully Convolutional Deep Learning Receiver", arXiv:2005.01494v2[eess.SP], May 5, 2020, 32 pages.

Ciflikli, C. et al., "Artificial Neural Network Channel Estimation Based on Levenberg-Marquardt for OFDM Systems," Wireless Personal Communications, vol. 51, No. 2, Nov. 14, 2008.

Felix, A. et al., "OFDM-Autoencoder for End-to-End Learning of Communications Systems," Mar. 15, 2018.

Ye, H. et al., "Power of Deep Learning for Channel Estimation and Signal Detection in OFDM Systems," vol. 7, No. 1, Aug. 28, 2017.

European Office Action for Application No. 20768520.7, dated Oct. 23, 2025, 7 pages.

Ait Aoudia et al., Model-Free Training of End-to-End Communication Systems. IEEE Journal of Selected Areas in Communications. Nov. 2019;37(11):2503-2516.

\* cited by examiner

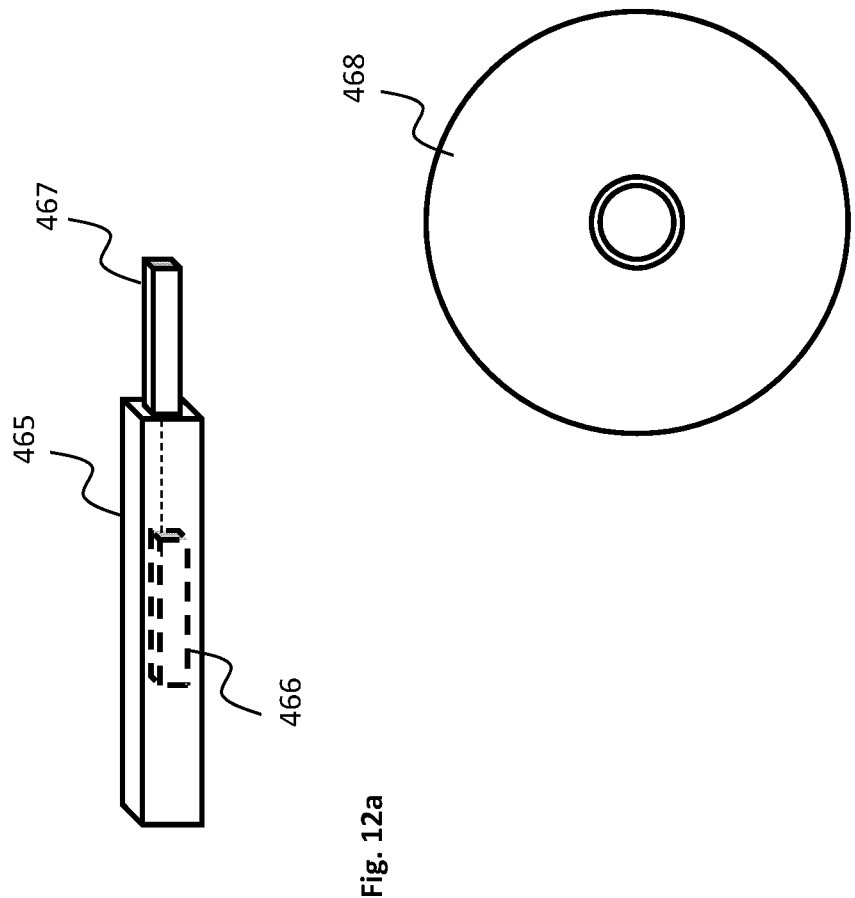

RADIO RECEIVER, TRANSMITTER AND SYSTEM FOR PILOTLESS-OFDM COMMUNICATIONS

CROSS REFERENCE TO RELATED APPLICATION

This patent application is a U.S. National Stage application of International Patent Application Number PCT/EP2020/074001 filed Aug. 27, 2020, which is hereby incorporated by reference in its entirety.

TECHNICAL FIELD

The present disclosure relates to the field of wireless communications in general, and in particular to methods and devices for wireless communication over time- and frequency-selective fading channels using orthogonal frequency division multiplexing (OFDM).

BACKGROUND

In wireless communications over time- and frequency-selective fading channels, the signal transmitted by a transmitter undergoes a random transformation, which must be undone at the receiver in order to decode the transmitted signal or message.

There exist two broad approaches to communications over time- and frequency-selective fading channels: coherent and non-coherent techniques.

In coherent communications, the receiver estimates a channel based on pilots sent by the transmitter and then decides on which symbols have been sent after an equalization step that essentially undoes the effects of the channel. Usually the channel can be estimated either through orthogonal or super-imposed pilots. In the former case, dedicated pilot symbols are transmitted that do not interfere with the data symbols. In the latter case, pilots and data symbols are transmitted at the same time (hence super-imposed) and therefore interfere with each other. Orthogonal pilots make the channel estimation and detection simple but are generally less spectrally efficient as super-imposed pilots which require very complex receiver algorithms. There are also data-aided schemes where the data symbols are used (after a first detection step based on pilot-based channel estimation) to compute a refined channel estimate which in turn enables a better data detection. Such techniques provide some gains but only at sufficiently high signal-to-noise-ratios (SNRs).

In non-coherent communications, the transmitter encodes information in the difference between two subsequently transmitted symbols, which a receiver can detect even when the channel is unknown. No pilot transmissions are hence required but such techniques typically suffer from error propagation and do not work well when the channel changes too rapidly.

It was recently shown in Honkala et al: "DeepRx: Fully Convolutional Deep Learning Receiver"; arXiv preprint arXiv:2005.01494 (2020), that a convolutional neural network can be leveraged to replace most of the algorithms in an OFDM receiver. A fully convolutional neural network is trained, to process the post-FFT received transmission time interval (TTI) symbols of a 5G system, consisting of several hundred sub-carriers across 14 OFDM symbols, and compute the log-likelihood ratios (LLRs) of the transmitted bits. The use of orthogonal pilots is still required to enable reconstruction of the transmitted signal by the receiver, in particular 5G-compliant pilot signalling is used at the receiver.

Known solutions involve a high amount of pilot signalling, to allow the receiver to accurately estimate the channel impulse response. The more pilots are sent, the better the quality of the channel estimate, but the less resources are left for data transmission. There is hence a non-trivial optimal tradeoff between the number of pilots and data symbols to be used in order to maximize the throughput.

When a channel varies quickly, e.g., due to high speed of either transmitter or receiver, many pilots are needed, while few pilots are sufficient in a quasi-static scenario. For this reason, most wireless communication standards specify multiple pilot patterns a transmitter can use. However, there is a substantial signalling and computing overhead related to deciding on the best pilot pattern to use.

It is therefore desired to provide a solution for OFDM-based transmission, which addresses the above-mentioned drawbacks.

SUMMARY

The scope of protection sought for various example embodiments of the invention is set out by the independent claims. The example embodiments and features, if any, described in this specification that do not fall under the scope of the independent claims are to be interpreted as examples useful for understanding various example embodiments of the invention.

In a first aspect, a receiver of a communication system is provided. The receiver is configured to communicate with at least one transmitter of the communication system using a plurality of resource elements within a time-frequency grid OFDM grid of the communication system. The receiver comprises means for receiving, from the at least one transmitter, transmitted signals comprising data-carrying symbols modulated using a constellation $\mathcal{C}$, wherein the data-carrying symbols are transmitted and received on all resource elements of the used plurality of resource elements within the OFDM grid. Further, the receiver comprises means for implementing a neural network, the neural network being configured to operate jointly on the plurality of resource elements, in particular on multiple OFDM symbols and subcarriers of the OFDM grid, and to output, based on the received data-carrying symbols, a plurality of LLRs to reconstruct information bits from the received data-carrying symbols, wherein the neural network is optimized with respect to the constellation $\mathcal{C}$.

As no reference signals are transmitted (that is, no super-imposed nor orthogonal pilots) the receiver can only exploit the constellation, in particular the constellation geometry, to reconstruct the transmitted bits. For this, the neural network-based receiver (NN-based receiver) is optimized with respect to the constellation $\mathcal{C}$. The proposed NN-based receiver allows for successful reconstruction (e.g., demodulation and demapping) of the received data-carrying symbols without requiring reference or pilot signals. In addition to the constellation $\mathcal{C}$, the NN-based receiver might be optimized with respect to further parameters, such as, underlying channel model or used hardware.

By being able to operate on the plurality of resource elements as a joint input, that is, to operate on multiple OFDM symbols and subcarriers at the same time (i.e., all resource elements of the selected or used plurality of resource elements of the time-frequency OFDM grid), the NN-based receiver learns the channel statistics for a more accurate estimation of the channel behaviour, which does not relay on additional reference or pilot signals. As all resource elements are allocated only to data carrying symbols, significant throughput gains, especially in high speed scenarios, are achieved. Further, as no pilot patterns are needed, the overhead due to algorithmic and signalling complexity for selecting the best pilot pattern for a given channel state, is avoided.

Through the application the expression "all resource elements" may be understood as "all sub-carriers of multiple OFDM symbols". The embodiments disclosed herein may also work when less resource elements are used by the transmitter, that is, when the transmitter is using only some of the resource elements (i.e., a plurality) of all the resource elements of the OFDM grid. That is, in some embodiment, multiple transmitters may share the available resource elements, e.g., as provided by a scheduling algorithm.

In some embodiments of the present disclosure, the receiver neural network may comprise a plurality of parameters, in particular weights and layers, the parameters having values obtained by jointly training the receiver and the constellation $\mathcal{C}$. Preferably, the constellation shaping (i.e., geometry) and associated bit labelling, which are used to modulate coded bits on the plurality of resource elements, and the receiver parameters, are jointly learned.

In some embodiments of the present disclosure, the neural network may be a convolutional neural network CNN comprising a plurality of layers, in particular, a first layer mapping the received data-carrying symbols to a real-valued tensor, and a plurality of hidden layers, wherein at least one hidden layer has residual connections. Preferably, the at least one hidden layer may implement a residual block. Preferably, the residual block comprises two separable convolutional layers with same dimensions. With other words, the neural network used at the receiver has a fully convolutional structure and operates jointly on multiple subcarriers and OFDM symbols.

Preferably, the first layer is a $\mathbb{C}\,2\,\mathbb{R}$ layer, which maps the data-carrying symbols to a 2-dimensional tensor by stacking the real and imaginary parts of the received symbols into an additional dimension.

In some embodiments of the present disclosure, the receiver may perform a discrete Fourier Transform and/or a cyclic prefix removal on the received data-carrying symbols, to obtain a plurality of OFDM symbols as input to the neural network.

In a second aspect, this specification describes a transmitter of a communication system. The transmitter is configured to communicate with at least one receiver using a plurality of resource elements within a time-frequency OFDM grid. The transmitter contains means configured to perform: modulating bits according to a constellation $\mathcal{C}$, to obtain data-carrying symbols, to be transmitted over the plurality of resource elements of the OFDM grid. The transmitter is configured to transmit the data-carrying symbols using all resource elements of the plurality of the resource elements of the OFDM grid to the at least one receiver, wherein the transmitter is configured to obtain the constellation $\mathcal{C}$ from an algorithm with trainable parameters.

Compared to classical systems, the transmitter according to the second aspect uses all resource elements of the plurality of resource elements selected from the OFDM grid to carry data symbols. There is no resource element being assigned to a reference signal. This allows for higher throughputs, as all used resource elements are carrying data. The data loss due to resource elements being allocated to reference signals is thus completely avoided.

In some embodiments of the present disclosure, the output of the algorithm with trainable parameters is a complex-valued vector $\tilde{\mathcal{C}}$, of dimension corresponding to the modulation order. Preferably, the transmitter is further configured to obtain the constellation $\mathcal{C}$ by normalizing the complex-valued vector $\tilde{\mathcal{C}}$.

In a preferred embodiment, the transmitter may be further configured to obtain the constellation $\mathcal{C}$ by normalizing and centering the complex-valued vector $\tilde{\mathcal{C}}$, in particular, $$C = \frac{\tilde{C} - \frac{1}{2^m}\Sigma_{c \in \tilde{C}} c}{\sqrt{\frac{1}{2^m}\Sigma_{c \in \tilde{C}}|c|^2 - \left|\frac{1}{2^m}\Sigma_{c \in \tilde{C}} c\right|^2}}. \qquad (1)$$

Normalization of the constellation ensures it has unit average power, while centering forces the constellation to have zero mean and therefore avoids an undesired DC offset.

In a third aspect, this specification describes a communication system comprising at least one receiver, at least one transmitter, and at least one communication channel. The at least one receiver is configured to communicate with the at least one transmitter over a corresponding channel using a plurality of resource elements within a time-frequency OFDM grid. The at least one transmitter is configured to transmit data-carrying symbols using all resource elements of the plurality of resource elements within the OFDM grid, wherein the data-carrying symbols are modulated using a constellation $\mathcal{C}$. The receiver is configured to receive the data-carrying symbols on all resource elements of the plurality of resource elements of the OFDM grid, and to implement a neural network, the neural network being configured to operate on the plurality of resource elements, in particular on multiple OFDM symbols and subcarriers of the OFDM grid, and to output, based on the received data-carrying symbols, a plurality of LLRs to reconstruct information bits from the received data-carrying symbols. Further, the neural network is optimized with respect to the constellation $\mathcal{C}$.

Preferably, the receiver is the receiver according to the first aspect. Preferably, the transmitter is the transmitter according to the second aspect.

In a fourth aspect, this specification describes a method for performing in a communication system, comprising at least one receiver, at least one transmitter, and at least one communication channel, the following steps. The at least one receiver and the at least one transmitter communicates over a corresponding channel using a plurality of resource elements of an OFDM grid. The at least one receiver may be the receiver according to the first aspect. The at least one transmitter may be the transmitter according to the second aspect. The method comprises in a step (a), initializing parameters of a trainable algorithm for generating a constellation $\mathcal{C}$ and initializing parameters of the at least one receiver. In a further step (b), a plurality of bits is sampled and modulated using the constellation $\mathcal{C}$, to obtain signals to be transmitted. In a further step (c), a plurality of LLRs is determined from symbols received at the receiver corresponding to the transmitted signals, by using the neural network of the receiver. Subsequently, in step (d) the parameters of the trainable algorithm and the parameters of the receiver are updated based on a loss function, and steps b) to d) are repeated until a termination condition is reached.

Preferably, the communication system is the communication system according to the third aspect.

In some embodiments of the present disclosure, the loss function is determined based on an information rate metric of the communication system, in particular, the total binary cross-entropy of the communication system.

In some embodiments of the present disclosure, the loss function is determined based on the number of resource elements per OFDM grid, the plurality of bits transmitted on all resource elements of the plurality of resource elements, and the corresponding plurality of LLRs obtained by the receiver.

In some of the present disclosure, the parameters of the trainable algorithm and the parameters of the receiver are updated by applying an iterative method for optimizing the loss function, in particular stochastic gradient descent (SGD) or a variant thereof.

In some embodiments of the present disclosure, the method further comprises sampling channel realization and determining channel outputs, wherein the plurality of LLRs is determined from the channel outputs using the neural network.

In some embodiments of the present disclosure, the transmitted signals are based on perturbed channel symbols generated at the transmitter, wherein the channel symbols and the perturbation are known at the receiver, and wherein the loss function is determined based on the channel symbols and the perturbation. Preferably, the loss function is determined based on the channel symbols and the perturbation using reinforcement learning.

This allows to implement the training procedure for learning the constellation, in particular, a highly performing constellation, when the channel includes non-differentiable components, such as quantization, or even in cases when no channel model is available. Such a highly performing constellation provides good performance in terms of BERs (bit error rates) close to the ones achieved by perfect channel knowledge at the receiver.

In some embodiments of the present disclosure, the trainable algorithm for generating the constellation $\mathcal{C}$ is implemented by a neural network model, which takes as input channel characteristics, in particular, SNR, user speed, delay spread, Doppler spread, carrier frequency, and/or sub-carrier spacing, and outputs the constellation $\mathcal{C}$.

In some embodiments of the present disclosure, the output of the algorithm with trainable parameters is a complex-valued vector $\tilde{\mathcal{C}}$, of dimension corresponding to the modulation order; and the constellation $\mathcal{C}$ is obtained by normalizing the complex-valued vector $\tilde{\mathcal{C}}$.

In some embodiments of the present disclosure, the output of the algorithm with trainable parameters is a complex-valued vector $\hat{\mathcal{C}}$, of dimension corresponding to the modulation order, wherein the constellation $\mathcal{C}$ is obtained by normalizing and centering the complex-valued vector $\tilde{\mathcal{C}}$, in particular, $$\mathcal{C} = \frac{\tilde{\mathcal{C}} - \frac{1}{2^m}\Sigma_{c\in\tilde{\mathcal{C}}}c}{\sqrt{\frac{1}{2^m}\Sigma_{c\in\tilde{\mathcal{C}}}|c|^2 - \left|\frac{1}{2^m}\Sigma_{c\in\tilde{\mathcal{C}}}c\right|^2}}.$$

In some embodiments of the present disclosure, the termination condition comprises a defined number of iterations or a value of the loss function not improving over a predefined number of iterations.

The method according to the fourth aspect extends the known end-to-end learning of communications systems to OFDM channels, to provide joint optimization of the constellation geometry, bit labeling and neural network based receiver, for enabling pilotless communication. Because no orthogonal pilots are transmitted, the receiver can only exploit the constellation geometry to reconstruct the transmitted bits, as no reference signal (superimposed or orthogonal) is transmitted. Preferably, a single constellation can be learned, which is used for all signal-to-noise ratios (SNRs), Doppler, and delay spreads.

In a fifth aspect, this specification describes a computer readable medium comprising program instructions stored thereon for performing at least the following: (a) initializing, at a receiver of a communication system, parameters of a trainable algorithm for generating a constellation $\mathcal{C}$ and initializing parameters of a neural network, NN, of the receiver; (b) receiving, at the receiver, transmitted signals from at least one transmitter, wherein the at least one transmitter communicates with the receiver using a plurality of resource elements of a time-frequency OFDM grid, wherein the transmitted signals comprise data-carrying symbols modulated using the constellation $\mathcal{C}$, wherein the data-carrying symbols are transmitted and received on all resource elements of the used plurality of resource elements within the OFDM grid; (c) determining a plurality of LLRs from symbols received at the receiver corresponding to the transmitted signals, using the neural network of the receiver; (d) updating the parameters of the trainable algorithm and the parameters of the neural network of the receiver based on a loss function; and (e) repeating steps b) to d) until a termination condition is reached.

In some embodiments of the present disclosure, the used constellation $\mathcal{C}$ has zero mean. This has the effect, that the constellation $\mathcal{C}$ is not equivalent to super-imposed pilots, and the direct current, DC, offset is therefore prevented.

Further aspects, features, and advantages of the present invention will become apparent to those of ordinary skills in the art upon reviewing the following detailed description of preferred embodiments and variants of the present invention in conjunction with the accompanying figures.

BRIEF DESCRIPTION OF THE DRAWINGS

Example embodiments will now be described, by way of example only, with reference to the following schematic drawings, in which:

FIGS. 12a and 12b show tangible media, respectively a removable non-volatile memory unit and a Compact Disc (CD) storing computer-readable code which when run by a computer perform operations according to example embodiments.

DETAILED DESCRIPTION

Figure 1:
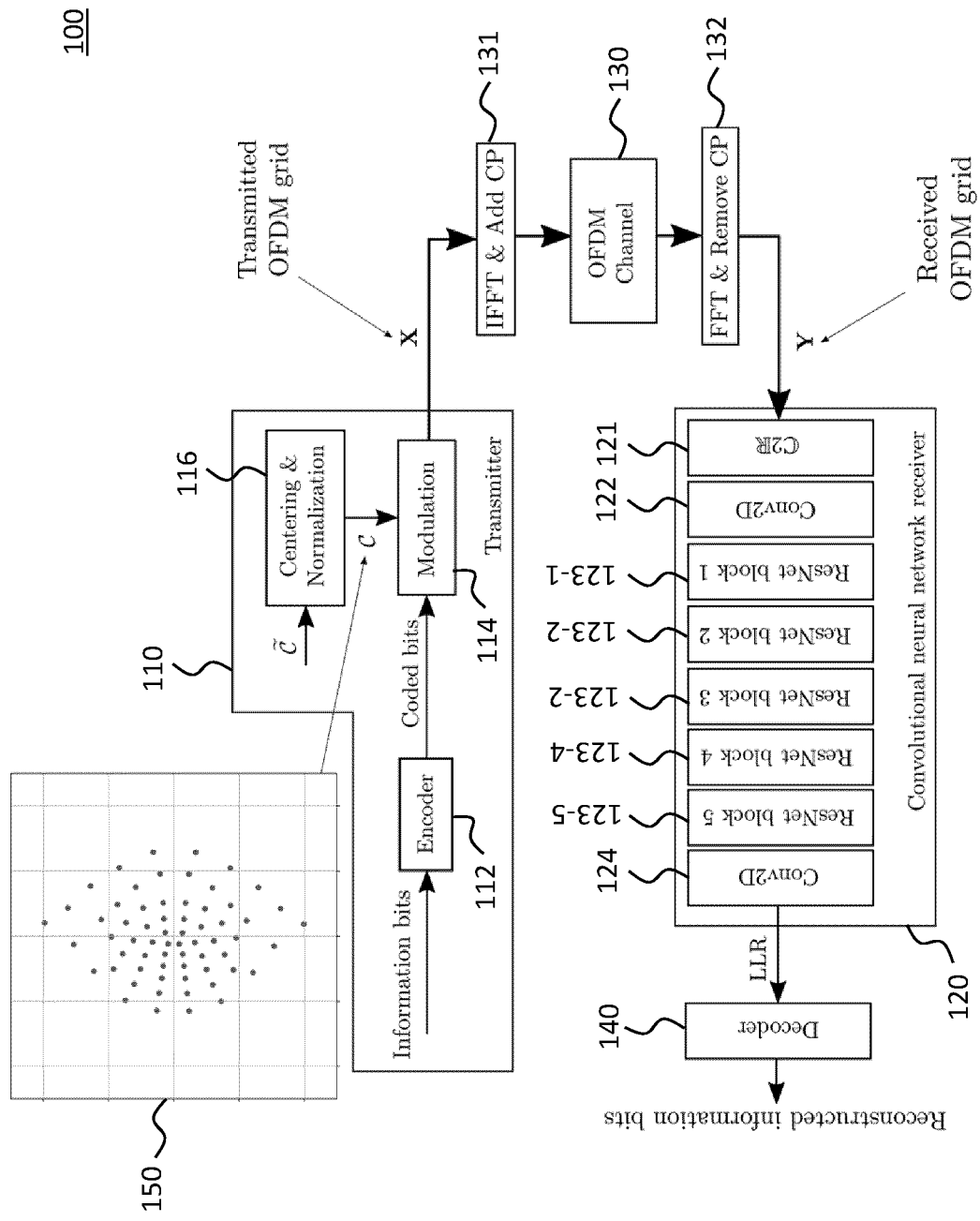
FIG. 1 shows a block diagram of a system in accordance with an example embodiment.

Detailed explanations of the present invention are given below with reference to attached drawings that illustrate specific embodiment examples of the present invention. These embodiments are described in sufficient detail to enable those skilled in the art to practice the invention. It is to be understood that the various embodiments of the present disclosure although different, are not necessarily mutually exclusive. For example, a particular feature, structure, or characteristic described herein in connection with one embodiment may be implemented within other embodiments without departing from the scope of the present invention. In addition, it is to be understood that the position or arrangement of individual elements within each disclosed embodiment may be modified without departing from the scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 is a block diagram of a communication system, indicated generally by the reference numeral 100, in accordance with an example embodiment. Deployment of the system 100 is described below according to an example embodiment with reference to FIG. 4. Training procedures may be provided for training the system 100. A training procedure according to an example embodiment is described below with reference to FIG. 5.

By way of example, the communication system 100 may be an OFDM communication system in which signals are allocated amongst resource elements of an OFDM transmission.

With reference to FIG. 1, the system 100 comprises a transmitter 110 and a receiver 120 that can communicate with each other using an OFDM channel 130.

The receiver 120 may be implemented as a neural network-based receiver (NN-based receiver). Preferably, the NN-based receiver 120 implements a residual convolutional neural network.

On the transmitter 110 side, information bits are fed to a channel encoder 112 which generates coded bits. The coded bits are input to a modulation entity 114 and modulated to channel baseband symbols according to a constellation $\mathcal{C}$, identified by reference numeral 150.

Modulation (c.f., step S10 in FIG. 4) of the coded bits is done by breaking the stream of coded bits into vectors of size m, and by mapping each vector to a baseband channel symbol according to a predefined labelling of the constellation points. The resulting transmitted signal X is a matrix of baseband symbols of size N×T where N is the number of subcarriers and T the number of OFDM symbols forming the OFDM grid. After further processing, such as, IFFT application in step S12, and insertion of a cyclic prefix 131 in step S14, the signal X is transmitted through the OFDM channel 130. The signal Y received at the receiver 120 is a matrix of received baseband symbols with same dimension as the transmitted signal X.

With reference to FIG. 1 and FIG. 4b, on the receiver side, the received baseband symbols Y (i.e., received samples) are fed to the (residual convolutional) neural network 120 in a step S24. Prior to this step, the baseband symbols Y may be processed by an FFT and cyclic prefix (CP) removal module 132 to apply an FFT in step S20 followed by a removal of the cyclic prefix in step S22. In a further step S24, OFDM symbols are accumulated from the processed signal, to obtain data-carrying symbols, which are fed to the NN-based receiver in step S26. The output of the NN-based receiver 120 are LLRs on the coded bits. These LLRs are then fed in step S28 to a channel decoder 140, e.g., a belief propagation decoder, which reconstructs the transmitted information bits.

The architecture of the neural network, NN, based receiver 120 will be described in the following with reference to FIG. 1 and FIG. 3, the latter showing the architectures of a ResNet block of the NN-based receiver in accordance with an example embodiment.

The NN-based receiver 120 may implement a convolutional neural network, CNN. The first layer of the CNN, C2R 121, may map the grid Y of complex baseband symbols to a real-valued tensor, preferably to a 2-dimensional tensor, by stacking the real and imaginary parts of the received symbols into an additional dimension. The second layer 122 and last layer 124 may be conventional 2-dimensional convolutional layers, Conv2D. The hidden layers 1231 to 1235 may have residual connections. With reference to FIG. 3, five ResNet blocks 1231 to 1235 form the hidden layers.

Figure 3:
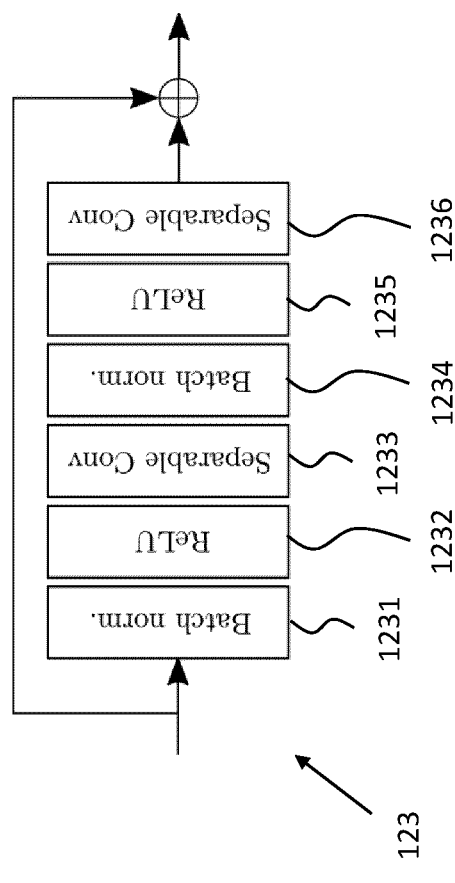
FIG. 3 shows the architectures of a ResNet block of the NN-based receiver in accordance with an example embodiment.

An example implementation of a ResNet 123 block is depicted in FIG. 3. This architecture just serves as an example, and other architectures are possible.

With reference to FIG. 3, each ResNet block 123 includes two separable convolutional layers 1233, 1236, preferably with the same dimensions, each one being preceded by respective Rectified Linear Unit ReLU layers 1232, 1235 and batch normalization layers 1231, 1234. The advantage of using separable convolutional layers is a reduced number of weights, without incurring significant loss of performance.

Other implementations of the NN-based receiver are possible. For instance, the NN-based receiver may be implemented using a recurrent neural network, RNN.

The NN-based receiver 120 may be configured to operate on multiple resource elements, i.e., multiple OFDM symbols and subcarriers. That is, the NN-based receiver 120 is configured to process multiple resource elements at a time, as opposed to conventional demappers which process one resource element at a time. This allows for successfully demodulating the received baseband symbols without the help of reference or pilot signals.

Figure 2:
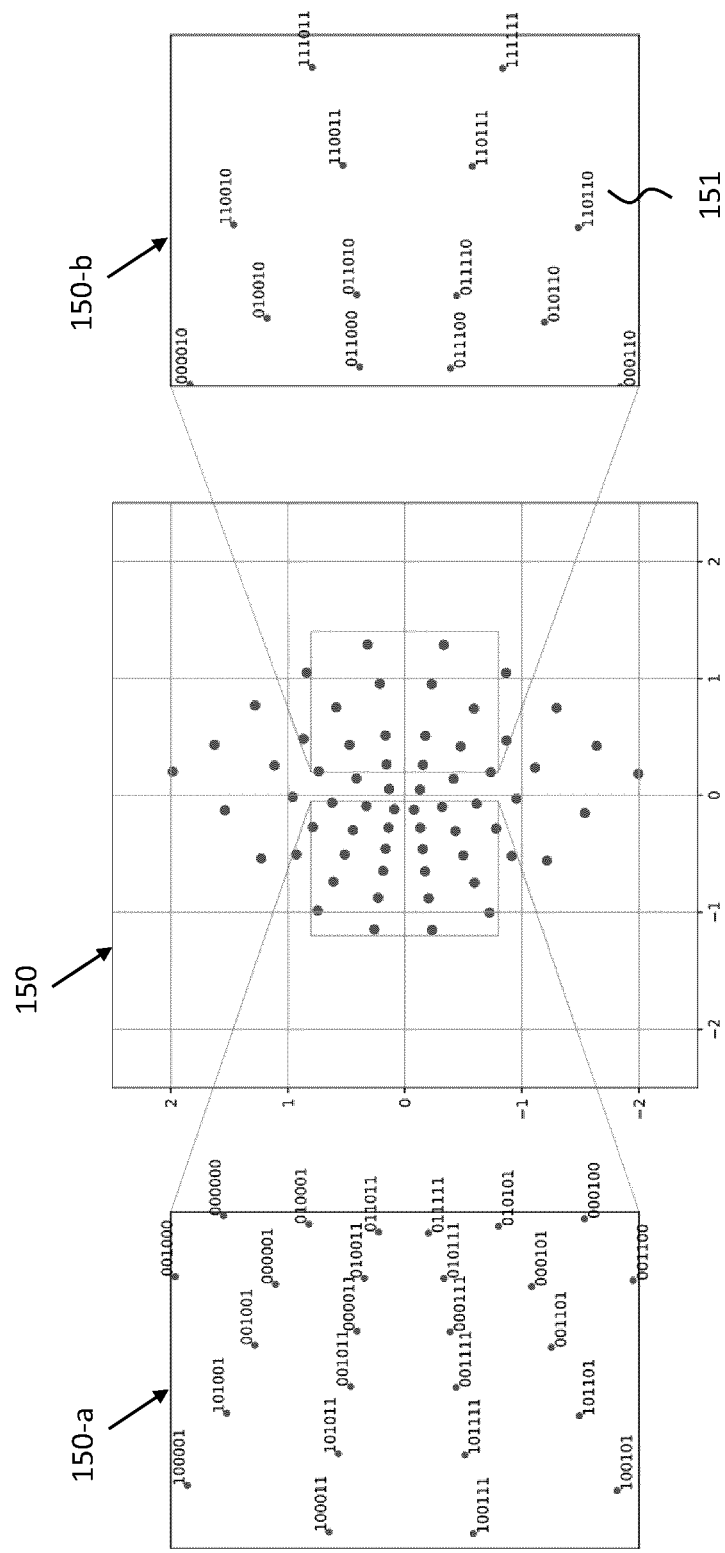
FIG. 2 shows a learned constellation and bit labelling in accordance with an example embodiment.

The present disclosure enables pilotless communication by jointly optimizing the neural network receiver and the constellation used for modulating the data-carrying symbols. FIG. 2 shows the learned constellation $\mathcal{C}$ and bit labeling in accordance with an example embodiment. Magnified portions of the constellation 150 are identified by reference numerals 150-a and 150-b. The constellation $\mathcal{C}$ consists of a set of $2^m$ complex points, 151, each complex point having a geometrical position and a bit label. Preferably, m is an integer. Values for m may include 2, 4, 6 and 8, corresponding to QPSK, 16QAM, 64QAM, and 256QAM, respectively. Alternatively, any integer value is possible without any restrictions on the value of m.

The optimal constellation $\mathcal{C}$, that is, the optimal geometry and bit labelling of the constellation points, is learned during training of the end-to-end system 100. Herein, optimal constellation refers to a constellation which provides good performance in terms of BERs (bit error rates) close to the ones achieved by perfect channel knowledge at the receiver, as illustrated below with reference to FIG. 9.

The learned constellation 150 is symmetric with respect to a single axis. The single-axis symmetry has the effect that the phase rotation in the transmitted signal due to physical propagation can be estimated at the receiver when decoding the received signals. Hence, the transformation, the transmitted signal was subjected to, can be undone at the receiver, without the need of additional pilots to estimate the channel. Such a constellation provides good performance in terms of BERs (bit error rates) close to the ones achieved by perfect channel knowledge at the receiver.

As the constellation geometry and labelling are jointly learned to achieve the best performance during the training process, the need for an extra and computationally costly labelling step is thus removed.

A training method for generating an optimal constellation according to an example embodiment is described below with reference to FIG. 5.

In a first step S30 parameters of a trainable algorithm for generating a constellation $\mathcal{C}$ and parameters of the at least one receiver are initialized. Preferably, these parameters are initialized with randomly chosen values.

In step S32, a plurality of bits for transmission are sampled and modulated using the constellation $\mathcal{C}$ (the initial constellation being generated using the initial parameters), to obtain signals to be transmitted.

Upon receiving the transmitted signals, the receiver 120 determines in step S34 a plurality of LLRs corresponding to the transmitted signals, using the neural network implemented in the receiver.

The parameters of the trainable algorithm and the parameters of the receiver may be updated based on a loss function in step S36, as discussed further below.

Steps S32 to S36 are repeated till a termination or stop criterion has been reached, S38. If the stop criterion has been reached, the training algorithm terminates and outputs the trained constellation. If the stop criterion has not been reached, the algorithm returns to the operation S32.

The stop criterion at step S38 can take multiple forms, e.g., stop after a predefined number of iterations or when the loss function has not decreased for a predefined number of iterations.

The loss function may be determined based on an information rate metric of the communication system, in particular, the total binary cross-entropy of the communication system.

Preferably, the loss function is determined based on the number of resource elements per OFDM grid, the plurality of bits transmitted on the plurality of resource elements and the corresponding plurality of LLRs obtained by the receiver, in particular, $$\mathcal{L} = -\frac{1}{BN}\sum_{i=1}^{B}\sum_{j=1}^{NT}\sum_{k=1}^{m}(B_{ijk}\log(\sigma(LLR_{ijk})) + (1-B_{ijk})\log(\sigma(-LLR_{ijk}))) \quad (\text{eq 1})$$

where NT is the number of resource element per OFDM grid, $B_{ijk}$ is $k^{th}$ bit transmitted in the $j^{th}$ resource element of the $i^{th}$ batch example, $LLR_{ijk}$ the corresponding LLR computed by the neural receiver, and $\sigma(\cdot)$ the sigmoid function.

The parameters of the trainable algorithm and the parameters of the receiver may be updated/adjusted in step S36 according to the loss function, for instance, by applying one step of stochastic gradient descent (SGD) on the above-defined loss function $\mathcal{L}$. Alternatively, variants of the SGD, such as Adam optimizer or RMSProp can be used, as well. The learning rate, batch size B, and possibly other parameters of the SGD variant applied (e.g., Adam, RMSProp . . . ) are optimization hyperparameters.

For applying backpropagation based on the above-defined loss function, a differentiable channel model is assumed. Such a channel model may be the canonical OFDM channel model $$Y = H \cdot X + W \quad (\text{eq2})$$

where H is the matrix of channel realization with dimensions N×T, W the matrix of Gaussian i.i.d. noise with dimensions N×T, and · denotes the elementwise product.

Then, if a dataset of channel realization $(H^{(i)})$, i=1, 2 . . . is available, the end-to-end system may be trained following the training method described with reference to FIG. 5, with the additional steps of sampling channel realization and computing channel outputs, as depicted in the following table and illustrated in FIG. 6.

Figure 5:
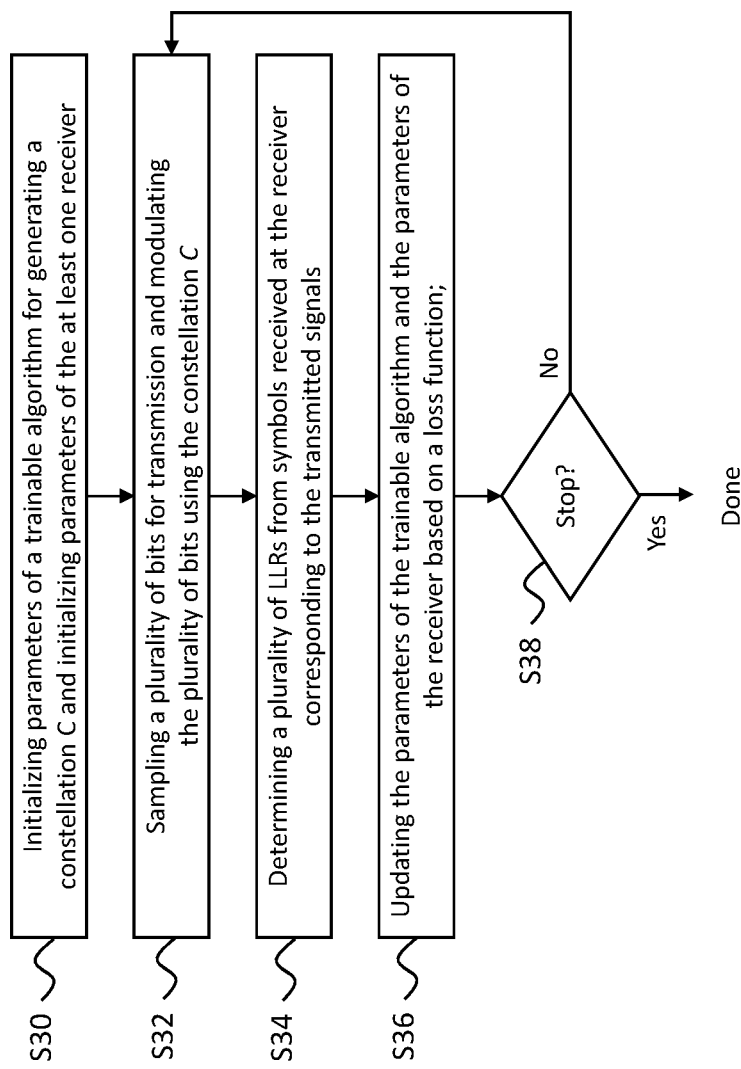
FIG. 5 shows a flow chart illustrating a training method in accordance with an example embodiment.

With reference to FIG. 5 and Table 1, step 1 corresponds to step S30, step 2 to S32, step 5 to S34, step 6 to S36, and step 7 to S38.

In step 1 above the parameters of the trainable algorithm for generating the constellation $\mathcal{C}$ are initialized, which can be regarded as equivalent to initializing or generating an initial constellation $\mathcal{C}$. This initial constellation $\mathcal{C}$ is

TABLE 1

| End-to-end training |
| --- |
| 1. Initialize the constellation $\mathcal{C}$ and the neural network receiver parameters, e.g., randomly. (step S40 in FIG. 6) |
| 2. Randomly sample i.i.d. uniformly distributed bits and modulate them using $\mathcal{C}$ to obtain B channel input matrices $(X^{(i)})$, i = 1 . . . B. (step S42) |
| 3. Sample B examples from the dataset: $(H^{(i)})$, i = 1 . . . B. (step S43) |
| 4. Compute channel outputs $(Y^{(i)})$, i = 1 . . . B using (eq2) by randomly sampling the Gaussian noise. (step S44) |
| 5. Apply the neural receiver to the channel outputs to compute LLRs on the transmitted bits. (step S45) |
| 6. Perform one step of SGD on the total binary cross-entropy (step S46) $$\mathcal{L} = -\frac{1}{BN}\sum_{i=1}^{B}\sum_{j=1}^{NT}\sum_{k=1}^{m}(B_{ijk}\log(\sigma(LLR_{ijk})) + (1-B_{ijk})\log(\sigma(-LLR_{ijk}))) \quad (\text{eq 1})$$ where NT is the number of resource element per grid, $B_{ijk}$ is $k^{th}$ bit transmitted in the $j^{th}$ resource element of the $i^{th}$ batch example, $LLR_{ijk}$ the corresponding LLR computed by the neural receiver, and $\sigma(.)$ the sigmoid function. |
| 7. Either stop or restart from step 2. (step S47) | refined through the above iterative training process, resulting in the learned constellation $\mathcal{C}$ 150, which is used by the transmitter 110 in FIG. 1 to modulate the channel baseband symbols for transmission.

In step 4, channel outputs are computed based on the canonical OFDM channel model of equation 2.

Other and potentially more complex channel models can be used, besides the above-described differentiable channel model.

Further, if no channel model is available or if the channel model is not differentiable, e.g., because it involves a quantization step, the training procedure may be implemented using reinforcement learning, such as the training procedure described in F. Ait Aoudia and J. Hoydis, "Model-Free Training of End-to-End Communication Systems," in IEEE Journal on Selected Areas in Communications, vol. 37, no. 11, pp. 2503-2516, November 2019.

Particularly, in one embodiment, in which the transmitted signals are based on perturbed channel symbols generated at the transmitter, wherein the channel symbols and the perturbation are known at the receiver, the loss function may be determined based on the channel symbols and the perturbation using reinforcement learning. Also here, the training procedure described for instance in the above-mentioned IEEE paper may be used for learning the loss function.

The output of the algorithm with trainable parameters may be a complex-valued vector $\tilde{\mathcal{C}}$, of dimension corresponding to the modulation order. The constellation $\mathcal{C}$ may be obtained by normalizing the complex-valued vector $\tilde{\mathcal{C}}$.

Figure 6:
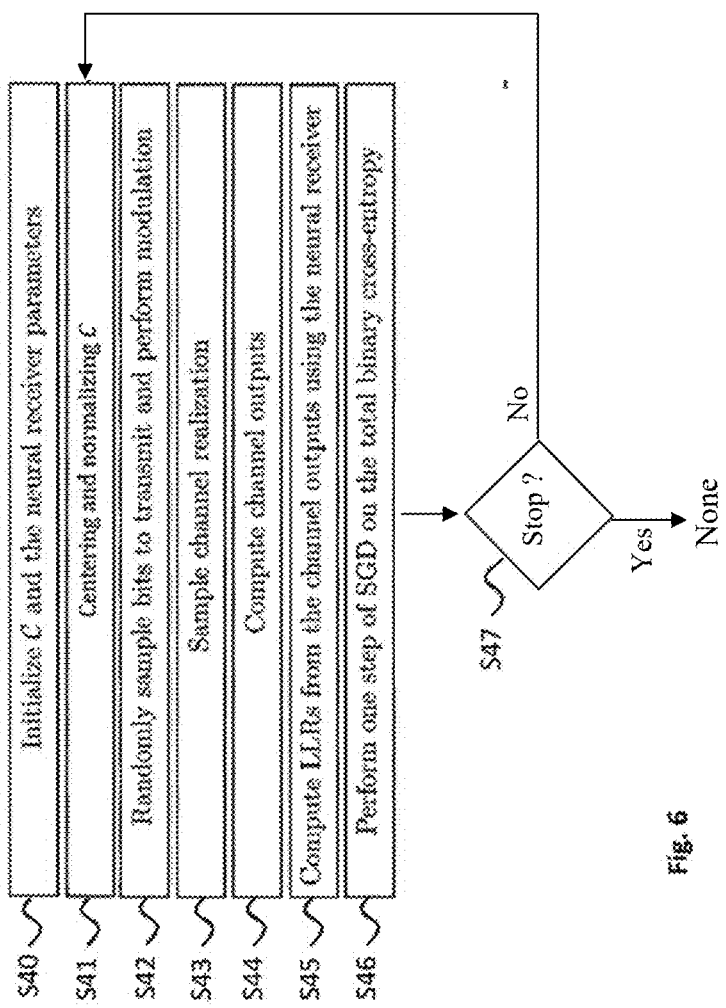
FIG. 6 shows a flow chart illustrating a training method in accordance with an example embodiment.

In some embodiments the constellation $\mathcal{C}$ may be obtained by normalizing and centering, e.g., by a centering and normalization module 116 in step S41 of FIG. 6, the complex-valued vector in particular, according to the equation:

$$C = \frac{\tilde{C} - \frac{1}{2^m}\Sigma_{c\in\tilde{C}}c}{\sqrt{\frac{1}{2^m}\Sigma_{c\in\tilde{C}}|c|^2 - \left|\frac{1}{2^m}\Sigma_{c\in\tilde{C}}c\right|^2}}$$

Normalization ensures unit average power, whereas centering ensures zero DC offset (under the assumption that coded bits are uniformly distributed). Preventing the DC offset is advantageous from an implementation perspective.

The trainable algorithm for generating the constellation $\mathcal{C}$ may be implemented by a neural network model, which takes as input channel characteristics, in particular, SNR, user speed, delay spread, Doppler spread, carrier frequency, and/or sub-carrier spacing, and outputs the constellation $\mathcal{C}$. The neural network model can be implemented in the transmitter 110 of the communication system 100. Alternatively, the neural network model can be implemented in a cloud. In the latter case, the transmitter obtains the constellation $\mathcal{C}$ from the cloud, possibly through dedicated signaling.

Figure 7:
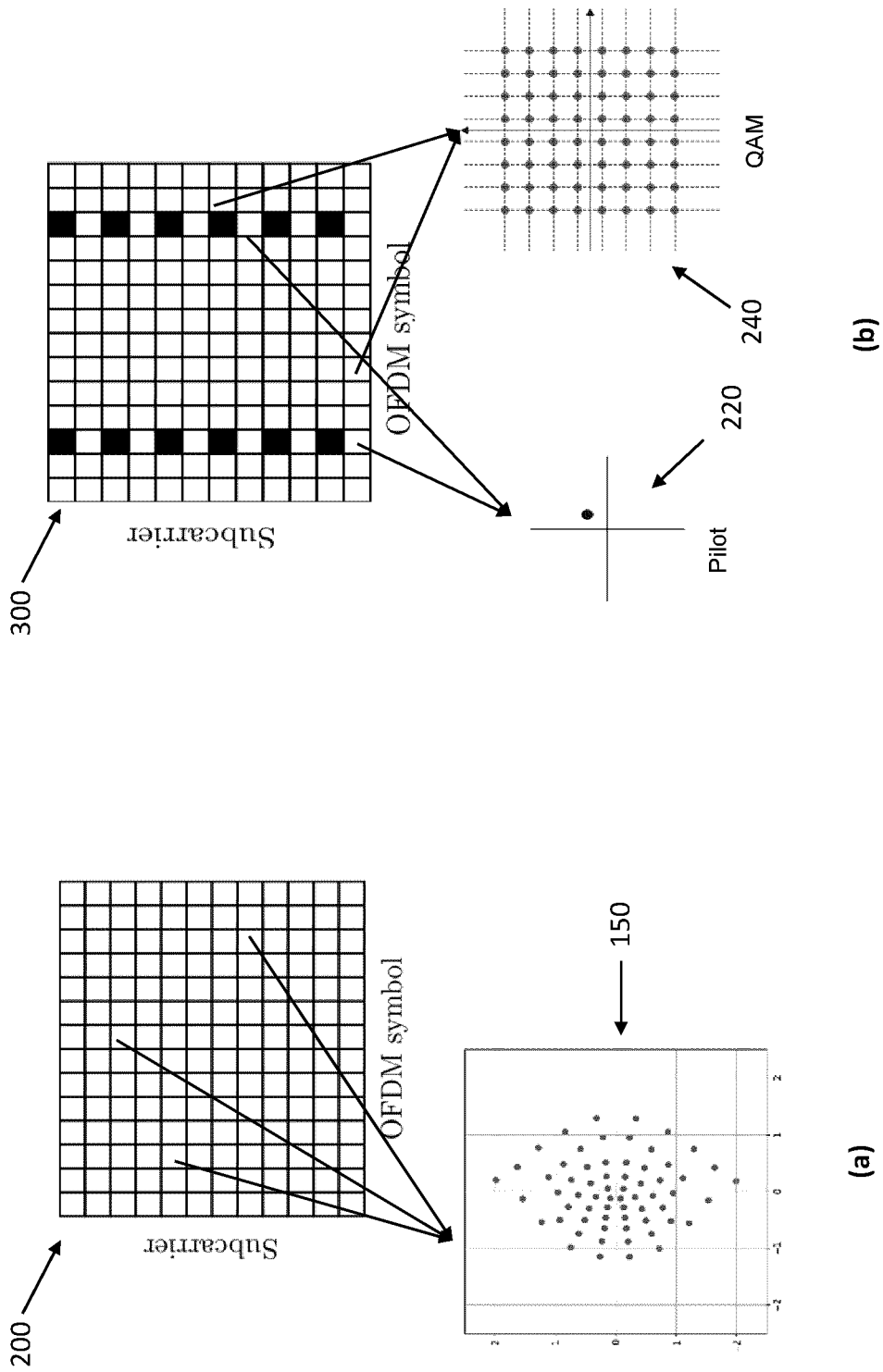
FIG. 7a shows a diagram illustrating a mapping between resource elements and a learned constellation in accordance with an example embodiment.
FIG. 7b shows a diagram illustrating a mapping between resource elements and a QAM constellation in accordance with a comparative example.

The embodiments described above are based on applying machine learning, ML, to jointly optimize a neural receiver, constellation geometry, and constellation labelling to enable pilot-less communication. Once trained, the learned constellation $\mathcal{C}$ is used to modulate the data carrying coded bits, in such a way that all resource elements 200 (i.e., sub-carriers of multiple OFDM symbols) are allocated to data carrying symbols, and none to reference signals, as illustrated in FIG. 7*a*. The embodiments disclosed herein also work when less resource elements are used by the transmitter, that is, when the transmitter is using only some of the resource elements (i.e., a plurality) of all the resource elements of the OFDM grid. In this case, multiple transmitters may share the available resource elements, e.g., as provided by a scheduling algorithm.

In contrast, in the comparative example depicted in FIG. 7*b*, which shows a mapping between resource elements 300 and a QAM constellation 240, some resource elements are allocated to pilots 220.

Figure 9:
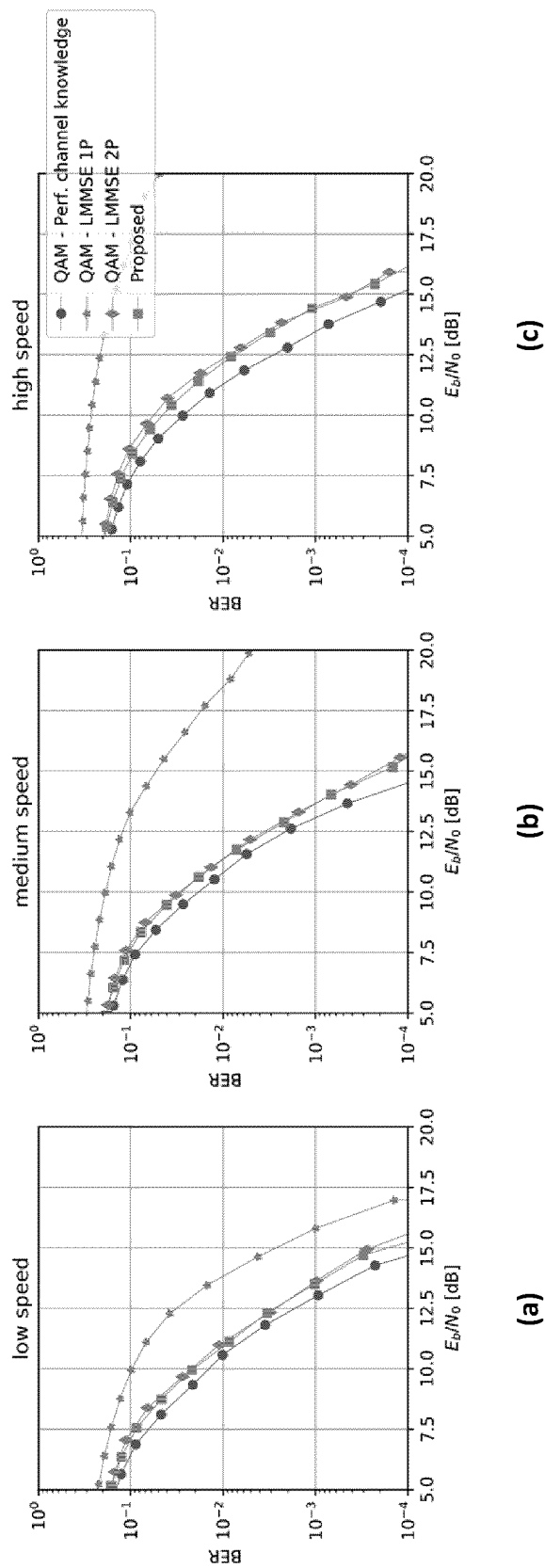
FIGS. 9 and 10 show simulation results in accordance with an example embodiment.
Figure 10:
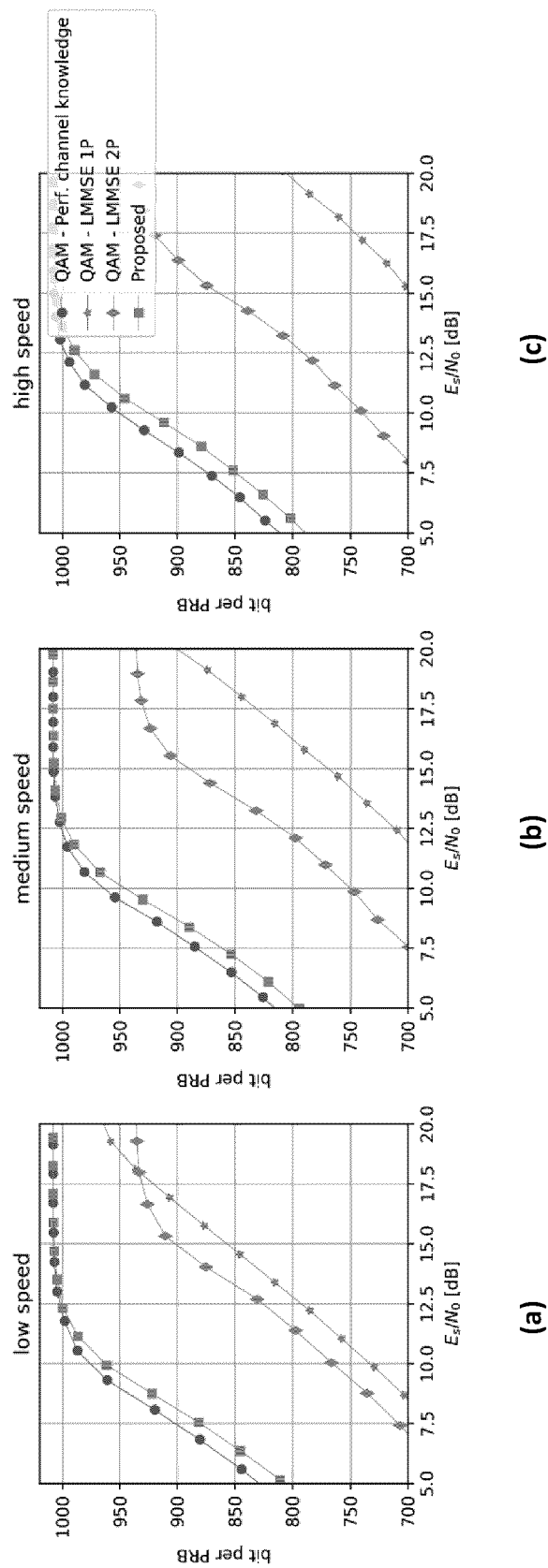

The embodiments described above enable BERs (bit error rates) close to the ones achieved by perfect channel knowledge at the receiver, despite the lack of pilots (or reference) signals, as shown by the simulation results depicted in FIGS. 9 and 10.

Simulation Settings

Simulations were performed over an OFDM channel with 72 subcarriers (6 physical resource blocks, PRBs) and 14 OFDM symbols (1 slot). The frequency carrier was set to 2.6 GHz and the subcarrier spacing to 15 kHz. The common Jakes model was considered to generate the time evolution of the channel, while 3GPP TDL power delay profiles were used to compute the spectral covariance. The modulation order was set to 64 (m=6), which has the same number of bits as 64QAM.

Two baselines were considered:

QAM with perfect channel knowledge at the receiver.

QAM with LMMSE channel estimation and with Gaussian demapping at the receiver. LMMSE channel estimation was performed over the entire grid (72 subcarriers and 14 OFDM symbols) using a correlation matrix estimated over 10^6 channel realizations. Typical practical channel estimators would estimate the channel only where pilots are transmitted, and then interpolate between estimates for data carrying resource elements. This is not how this baseline operates. It uses LMMSE channel estimation and knowledge of the channel correlation matrix to estimate the channel over the entire OFDM grid. Such a baseline requires the inversion of a matrix of size 1008×1008, as well as the knowledge of the channel correlation matrix over the entire resource grid, which makes it hard to implement in practical settings. However, it was considered as it is a highly performing baseline that serves as a proxy for good performing conventional approaches. But one should note that practical baselines would typically achieve lower performance.

Figure 8:
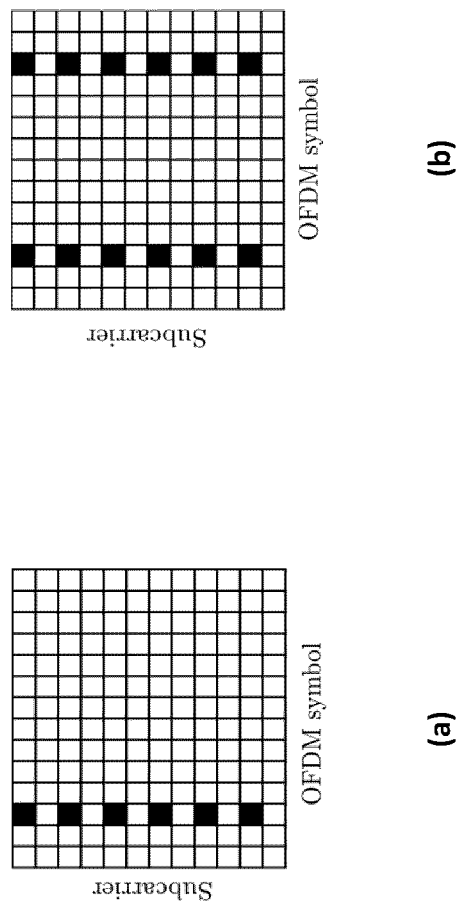
FIG. 8 shows comparative examples of the embodiments described herein illustrating resource allocation.

FIG. 8 shows the 5G pilot patterns considered for the LMMSE baseline. The pattern in FIG. 8*a* only carries pilot symbols on every other sub-carrier of one OFDM channel symbol. The pattern in FIG. 8*b* carries pilots on an additional OFDM symbol. These two pilot patterns are referred to as 1P and 2P, respectively. The 2P pilot patterns carries more pilots, and therefore enables better channel estimation, at the cost of potentially lower throughput as less resource elements are allocated to data carrying symbols. Note that the pilot patterns were used only for the LMMSE baseline. No reference signal was transmitted when using the proposed learning-based approach, i.e., data symbols were transmitted on all resource elements of the OFDM grid (as depicted in FIG. 7*a*).

Three speed ranges were considered:
Low: (0,5) m/s, i.e., (0, 18) km/h
Medium (15, 20) m/s, i.e., (54, 72) km/h
High (30, 35) m/s, i.e., (108, 126) km/h Training Training of the end-to-end system was performed on the speed range (0, 30) m/s, and using the TDL-B and TDL-C power delay profiles. The neural network receiver operates over the entire OFDM grid. Evaluations of the different schemes were performed for each of the speed ranges, and on the TDL-A power delay profile. FIG. 7a shows the learned constellation, which enabled reconstruction of the data by the receiver without the need for reference signals.

Results

FIG. 9 shows the BERs achieved by the evaluated schemes for the three speed ranges. The LMMSE baseline fails to achieve good BERs when the 1P pilot pattern is used, especially at medium and high speeds. The embodiments described herein achieve BERs close to perfect channel knowledge for all speed ranges, comparable with the case of the LMMSE baseline when the 2P pilot pattern is used. These results indicate that the present disclosure enables BERs close to those which could be achieved with perfect channel knowledge, despite the lack of reference signals.

FIG. 10 shows the goodput achieved by the different schemes of FIG. 9. Herein, goodput refers to the amount of bits transmitted which are correct, that is, the amount of correctly decoded bits per PRB. The LMMSE baseline saturates at a lower value, since a fraction of the available resource elements is allocated to reference signals. On the other hand, the solution according to the present disclosure achieves for high SNR the same goodput as when perfect channel knowledge is assumed at the receiver. In particular, compared to the LMMSE baseline with the 1P pilot pattern, up to 25% of goodput gains are observed for high speed scenarios.

The above described embodiments provide several advantages, in particular:

- By being able to operate on the plurality of resource elements as a joint input, that is, to operate on multiple OFDM symbols and subcarriers at the same time, the NN-based receiver learns the channel statistics for a more accurate estimation of the channel behavior, which does not relay on additional reference or pilot signals. As all resource elements are allocated to data carrying symbols, significant throughput gains, especially in high speed scenarios, are achieved.
- As no pilot patterns are needed, the overhead due to algorithmic and signaling complexity for selecting the best pilot pattern for a given channel state, is avoided. By using the learned constellation according to this disclosure, the demodulation reference signals (DMRS) in 5G can be completely avoided.
- The learned constellation geometry and neural receiver can be used by both the base station and mobile terminals, and hence, is applicable to both downlink and uplink communication.
- The disclosure enables hence a new disruptive way of communication without any pilots and at unprecedented throughput or reliability which could be the foundation of a lean 6G air interface from which the burden of pilot allocation/optimization is removed. The embodiments described through this application, are well suited for ultra-reliable and low-latency communications, very high-speed scenarios, or IoT type traffic.

Figure 11:
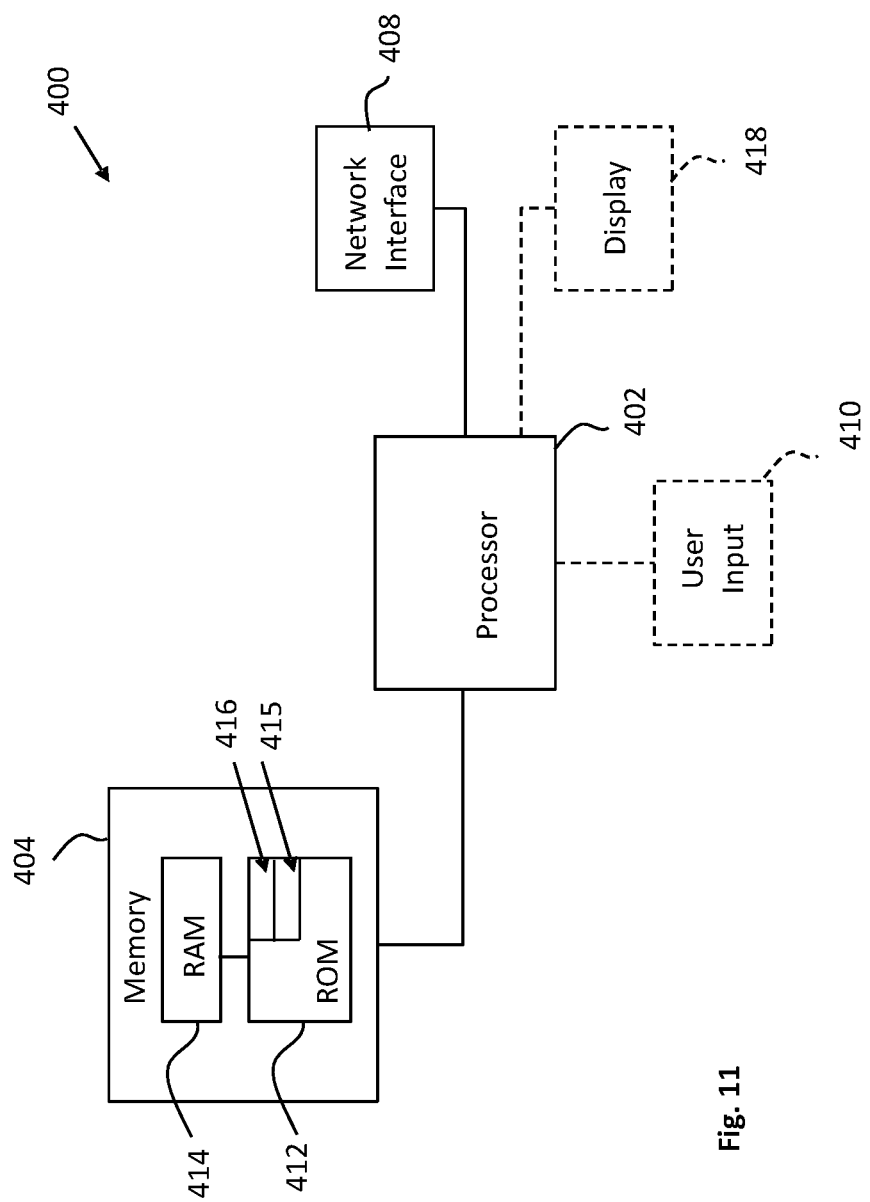
FIG. 11 is a block diagram of components of a system in accordance with an example embodiment.

For completeness, FIG. 11 is a schematic diagram of components of one or more of the example embodiments described previously, which hereafter are referred to generically as a processing system 400. The processing system 400 may, for example, be the apparatus referred to in the claims below.

The processing system 400 may have a processor 402, a memory 404 closely coupled to the processor and comprised of a RAM 414 and a ROM 412, and, optionally, a user input 410 and a display 418. The processing system 400 may comprise one or more network/apparatus interfaces 408 for connection to a network/apparatus, e.g. a modem which may be wired or wireless. The network/apparatus interface 408 may also operate as a connection to other apparatus such as device/apparatus which is not network side apparatus. Thus, direct connection between devices/apparatus without network participation is possible.

The processor 402 is connected to each of the other components in order to control operation thereof.

The memory 404 may comprise a non-volatile memory, such as a hard disk drive (HDD) or a solid-state drive (SSD). The ROM 412 of the memory 404 stores, amongst other things, an operating system 415 and may store software applications 416. The RAM 414 of the memory 404 is used by the processor 402 for the temporary storage of data. The operating system 415 may contain code which, when executed by the processor implements aspects of the algorithms described above. Note that in the case of small device/apparatus the memory can be most suitable for small size usage i.e. not always a hard disk drive (HDD) or a solid-state drive (SSD) is used.

The processor 402 may take any suitable form. For instance, it may be a microcontroller, a plurality of microcontrollers, a processor, or a plurality of processors.

The processing system 400 may be a standalone computer, a server, a console, or a network thereof. The processing system 400 and needed structural parts may be all inside device/apparatus such as IoT device/apparatus i.e. embedded to very small size.

In some example embodiments, the processing system 400 may also be associated with external software applications. These may be applications stored on a remote server device/apparatus and may run partly or exclusively on the remote server device/apparatus. These applications may be termed cloud-hosted applications. The processing system 400 may be in communication with the remote server device/apparatus in order to utilize the software application stored there.

FIGS. 12a and 12b show tangible media, respectively a removable memory unit 465 and a compact disc (CD) 468, storing computer-readable code which when run by a computer may perform methods according to example embodiments described above. The removable memory unit 465 may be a memory stick, e.g. a USB memory stick, having internal memory 466 storing the computer-readable code. The internal memory 466 may be accessed by a computer system via a connector 467. The CD 468 may be a CD-ROM or a DVD or similar. Other forms of tangible storage media may be used. Tangible media can be any device/apparatus capable of storing data/information which data/information can be exchanged between devices/apparatus/network.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

Figure 4:
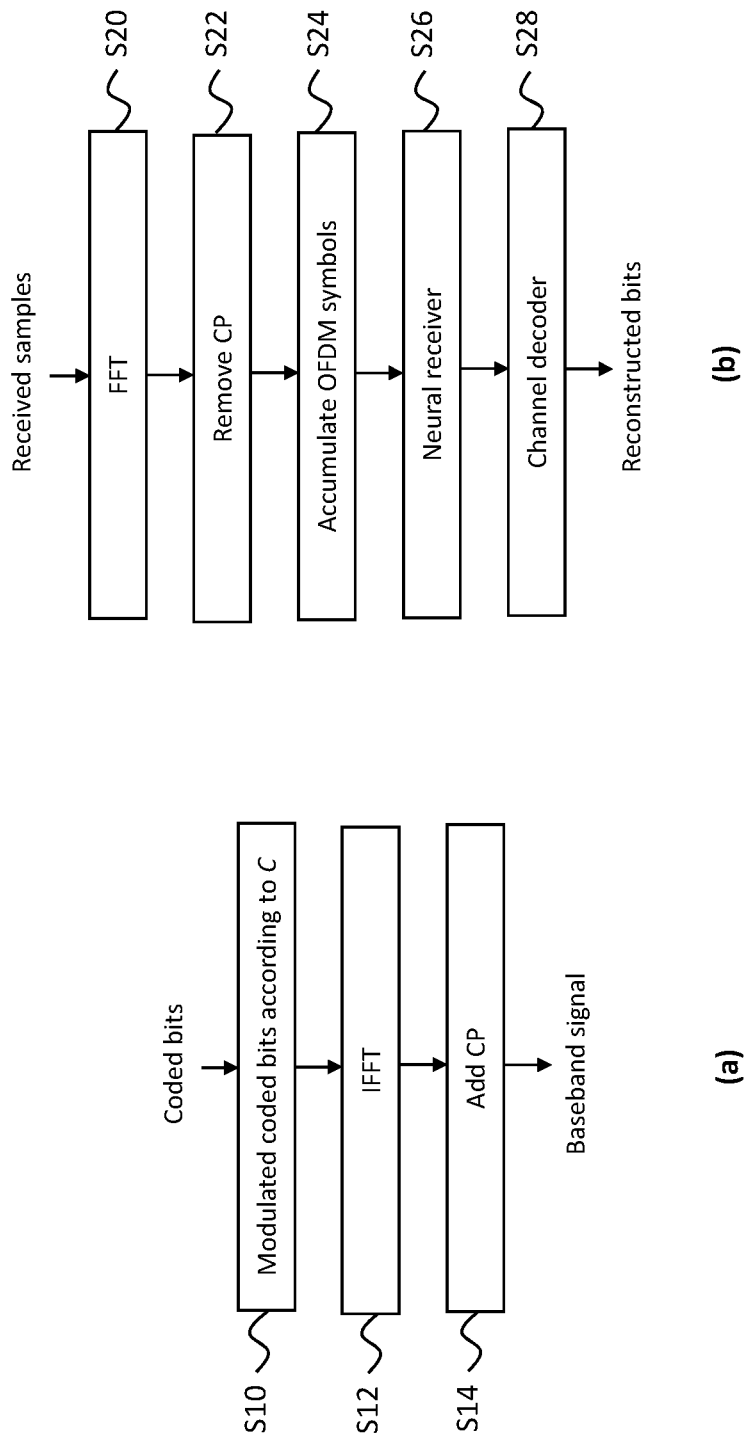
FIG. 4 shows flow charts illustrating the process of transmitting (a) and receiving (b) data-carrying symbols in accordance with an example embodiment.

If desired, the different functions discussed herein may be performed in a different order and/or concurrently with each other. Furthermore, if desired, one or more of the above-described functions may be optional or may be combined. Similarly, it will also be appreciated that the flow diagrams of FIGS. 4, 5, and 6 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. A receiver, configured to communicate with at least one transmitter using a plurality of resource elements within a time-frequency orthogonal frequency division multiplexing grid, the receiver comprising:
at least one processor; and
at least one non-transitory memory storing instructions that, when executed with the at least one processor, cause the receiver to perform:
receiving, from the at least one transmitter, transmitted signals comprising pilotless data-carrying symbols modulated using a constellation $\mathcal{C}$, wherein the pilotless data-carrying symbols are transmitted and received on resource elements of the used plurality of resource elements within the orthogonal frequency division multiplexing grid; and
implementing a neural network, the neural network being configured to operate jointly on the plurality of resource elements, wherein the plurality of resource elements comprises multiple orthogonal frequency division multiplexing symbols and subcarriers of the orthogonal frequency division multiplexing grid, and to output, based on the received pilotless data-carrying symbols, a plurality of log-likelihood ratios to reconstruct information bits from the received pilotless data-carrying symbols, wherein the neural network is optimized with respect to the constellation $\mathcal{C}$, and wherein the neural network comprises a plurality of parameters having values obtained with jointly training the receiver and the constellation $\mathcal{C}$.

2. The receiver according to claim 1, wherein the neural network is a convolutional neural network comprising a plurality of layers, wherein the plurality of layers comprises a first layer mapping the received data-carrying symbols to a real-valued tensor, and a plurality of hidden layers, wherein at least one hidden layer has residual connections.

3. A transmitter configured to communicate with at least one receiver using a plurality of resource elements within a time-frequency orthogonal frequency division multiplexing grid, the transmitter comprising:
at least one processor; and
at least one non-transitory memory storing instructions that, when executed with the at least one processor, cause the transmitter to perform:
obtaining a trained constellation $\mathcal{C}$ from an algorithm with trainable parameters;
modulating bits according to the trained constellation $\mathcal{C}$ to obtain pilotless data-carrying symbols; and
transmitting the pilotless data-carrying symbols using resource elements of the plurality of resource elements within the orthogonal frequency division multiplexing grid to the at least one receiver.

4. The transmitter according to claim 3, wherein an output of the algorithm with trainable parameters is a complex-valued vector $\tilde{\mathcal{C}}$, of dimension corresponding to a modulation order; and wherein the transmitter is further configured to obtain the trained constellation $\mathcal{C}$ with normalizing the complex-valued vector $\tilde{\mathcal{C}}$.

5. The transmitter according to claim 3, further configured to obtain the trained constellation $\mathcal{C}$ with normalizing and centering the complex-valued vector $\tilde{\mathcal{C}}$, wherein $$C = \frac{\tilde{C} - \frac{1}{2^m}\Sigma_{c\in\tilde{C}}c}{\sqrt{\frac{1}{2^m}\Sigma_{c\in\tilde{C}}|c|^2 - \left|\frac{1}{2^m}\Sigma_{c\in\tilde{C}}c\right|^2}}.$$

6. A communication system comprising at least one receiver and at least one transmitter, wherein:
the at least one receiver is configured to communicate with the at least one transmitter using a plurality of resource elements within a time-frequency orthogonal frequency division multiplexing grid;
the at least one transmitter is configured to:
obtain a trained constellation $\mathcal{C}$ from an algorithm with trainable parameters;
modulate bits according to the trained constellation $\mathcal{C}$ to obtain pilotless data- carrying symbols; and transmit the pilotless data-carrying symbols using resource elements of the plurality of resource elements within the orthogonal frequency division multiplexing grid; and the at least one receiver is configured to:
receive the pilotless data-carrying symbols on resource elements of the plurality of resource elements within the orthogonal frequency division multiplexing grid; and implement a neural network, the neural network being configured to operate jointly on the plurality of resource elements, and to output, based on the received pilotless data-carrying symbols, a plurality of log-likelihood ratios to reconstruct information bits from the received pilotless data-carrying symbols, wherein the plurality of resource elements comprises multiple orthogonal frequency division multiplexing symbols and subcarriers of the orthogonal frequency division multiplexing grid, and wherein the neural network is optimized with respect to the constellation $\mathcal{C}$.

7. A method for communication between at least one transmitter and at least one receiver of a communication system using a plurality of resource elements within a time-frequency orthogonal frequency division multiplexing grid, the method comprising:

initializing parameters of a trainable algorithm for generating a trained constellation $\mathcal{C}$;

initializing parameters of the at least one receiver;

sampling, by the at least one transmitter, a plurality of bits for transmission and modulating the plurality of bits using the trained constellation $\mathcal{C}$ to obtain pilotless signals to be transmitted to the at least one receiver;

determining, by the at least one receiver, a plurality of log-likelihood ratios from pilotless symbols received at the receiver corresponding to the transmitted pilotless signals, using a neural network of the at least one receiver;

updating the parameters of the trainable algorithm and the parameters of the at least one receiver based on a loss function; and repeating the sampling of the plurality of the bits, the determining of the plurality of the log-likelihood ratios, and the updating of the parameters of the trainable algorithm and the parameters of the at least one receiver until a termination condition is reached.

8. The method according to claim 7, wherein the loss function is determined based on an information rate metric of the communication system, wherein the information rate metric of the communication system comprises a total binary cross-entropy of the communication system.

9. The method according to claim 7, wherein the loss function is determined based on a number of resource elements per orthogonal frequency division multiplexing grid, the plurality of bits transmitted on resource elements of the plurality of resource elements, and the corresponding plurality of log-likelihood ratios obtained with the at least one receiver.

10. The method according to claim 7, wherein the parameters of the trainable algorithm and the parameters of the at least one receiver are updated with applying an iterative method for optimizing the loss function, wherein the iterative method comprises stochastic gradient descent or a variant thereof.

11. The method according to claim 7, wherein the method further comprises sampling channel realization and determining channel outputs, wherein the plurality of log-likelihood ratios is determined from the channel outputs using the neural network.

12. The method according to claim 7, wherein the transmitted pilotless signals are based on perturbed channel symbols generated at the at least one transmitter, wherein corresponding channel symbols and a corresponding perturbation are known at the at least one receiver, and wherein the loss function is determined based on the channel symbols and the perturbation.

13. The method according to claim 7, wherein the trainable algorithm for generating the trained constellation $\mathcal{C}$ is implemented with a neural network model, which takes input channel characteristics and outputs the constellation $\mathcal{C}$, wherein the input channel characteristics comprise at least one of signal-to-noise ratios, user speed, delay spread, Doppler spread, carrier frequency, or sub-carrier spacing.

14. The method according to claim 13, wherein an output of the trainable algorithm with trainable parameters is a complex-valued vector $\tilde{\mathcal{C}}$ of dimension corresponding to a modulation order, and wherein the trained constellation $\mathcal{C}$ is obtained with normalizing and centering the complex-valued vector $\tilde{\mathcal{C}}$, wherein $$c = \frac{\tilde{c} - \frac{1}{2^m}\Sigma_{c \in \tilde{\mathcal{C}}} c}{\sqrt{\frac{1}{2^m}\Sigma_{c \in \tilde{\mathcal{C}}} |c|^2 - \left|\frac{1}{2^m}\Sigma_{c \in \tilde{\mathcal{C}}} c\right|^2}}.$$

15. The method according to claim 7, wherein the output of the trainable algorithm with trainable parameters is a complex-valued vector $\tilde{\mathcal{C}}$ of dimension corresponding to a modulation order, and wherein the trained constellation $\mathcal{C}$ is obtained with normalizing the complex-valued vector $\tilde{\mathcal{C}}$.

16. The method according to claim 7, wherein the termination condition comprises a defined number of iterations or the loss function remaining constant over a predefined number of iterations.

17. A non-transitory program storage device readable with an apparatus, tangibly embodying a program of instructions executable with the apparatus for performing the method of claim 7.

* * * * *